Oct. 1, 1929.  S. P. MILLER  1,730,159
ROTARY FILTER
Filed Feb. 25, 1924   2 Sheets-Sheet 1
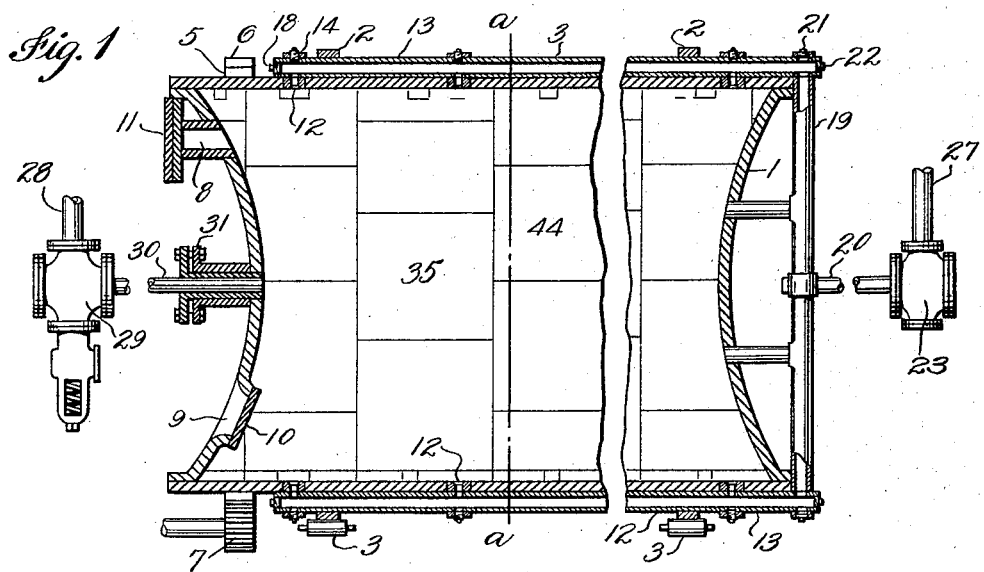
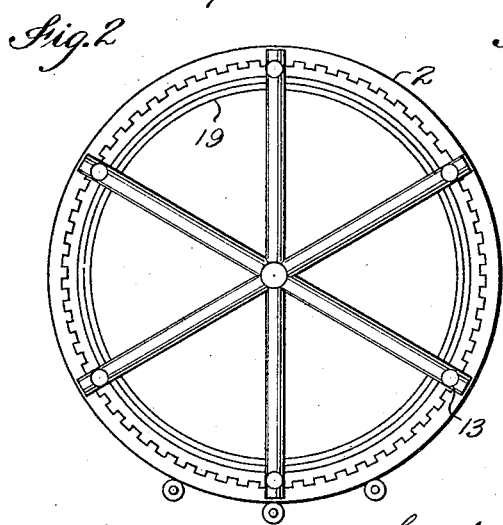
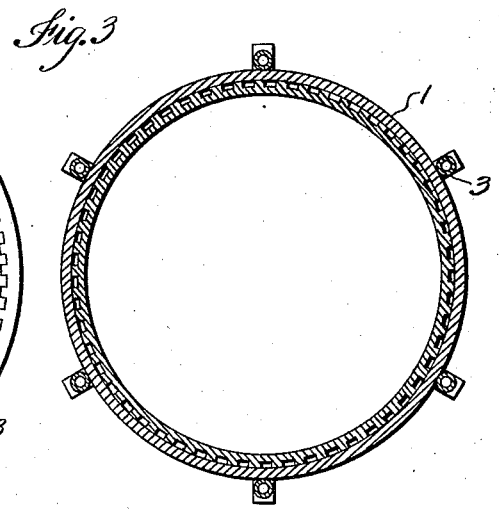
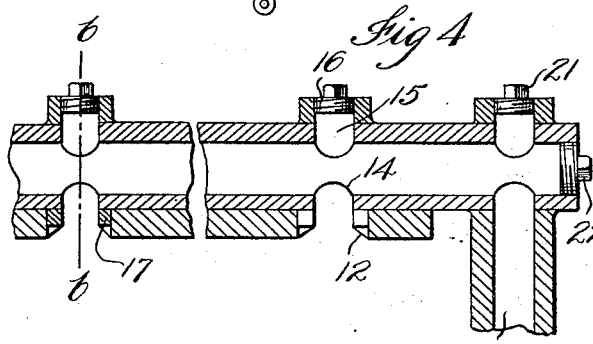
Inventor.
Stuart P. Miller
by Chas. W. Mortimer
Atty Oct. 1, 1929.  S. P. MILLER  1,730,159
ROTARY FILTER
Filed Feb. 25, 1924  2 Sheets-Sheet 2
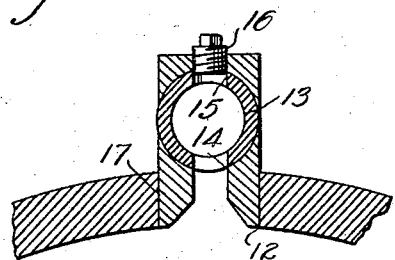
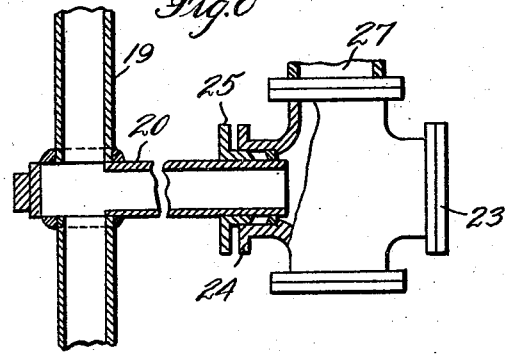
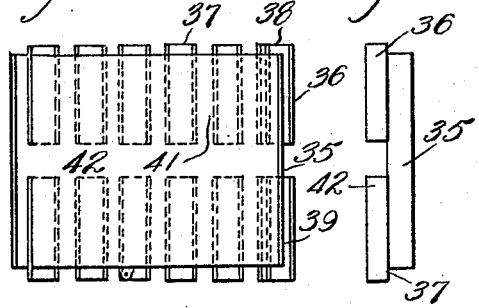
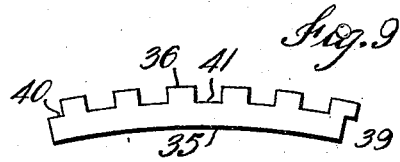
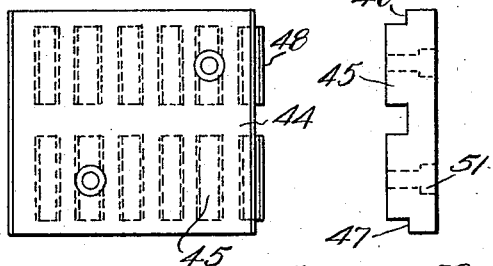
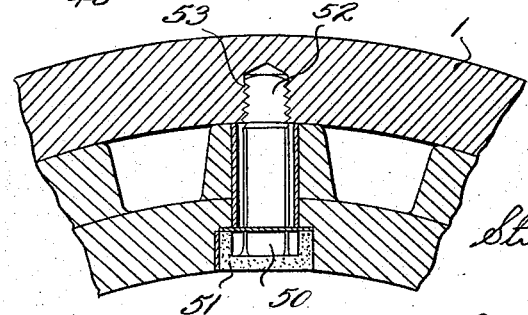
Inventor.
Stuart P. Miller
by
Chas. W. Mortimer
Atty.

Patented Oct. 1, 1929

1,730,159

UNITED STATES PATENT OFFICE

STUART P. MILLER, OF PHILADELPHIA, PENNSYLVANIA, ASSIGNOR TO THE BARRETT COMPANY, A CORPORATION OF NEW JERSEY

ROTARY FILTER

Application filed February 25, 1924. Serial No. 694,845.

This invention relates to a rotary filter. It relates more specifically to a filter suitable for filtering and washing naphthylamine, but it is not restricted to the filtering and washing of this particular material.

The invention will be understood from the description in connection with the accompanying drawings in which:

Fig. 1 is a longitudinal section through the filter;

Fig. 2 is an end view of the filter;

Fig. 3 is a cross section along the line a—a of Fig. 1;

Fig. 4 is a section showing details of the pipe connection;

Fig. 5 is a section along the line b—b of Fig. 4;

Fig. 6 is a view partly in section showing the pipe outlet;

Fig. 7 is a plan view of one of the filter blocks;

Fig. 8 is an end view of the same;

Fig. 9 is an edge view of the block;

Fig. 10 is a plan view of another filter block;

Fig. 11 is an end view of the same;

Fig. 12 is an edge view of this block; and

Fig. 13 is a detail showing how the filter block is attached to the drum.

In the drawings, reference character 1 indicates a drum or cylindrical shell which may be made of wrought iron or any other suitable material. The drum 1 is provided with rings 2 which rest upon roller bearings 3 which support the drum and permit easy rotation of same. A ring 5 provided with gear teeth 6 is rigidly attached to the drum and meshes with a pinion 7 which is driven by any convenient driving means so as to revolve the drum at the desired speed. The drum is provided with openings 8 and 9 in one end thereof which may be closed by vaportight closures 10 and 11. Series of openings 12 are provided through the sides of the drum. Pipes 13 extend along the outside of the drum 1 and are provided with holes 14 which register with the holes 12 in the drum. Holes 15 may also be provided on the other side of the pipes 13 from the holes 14 as is more clearly shown in Fig. 4 and these holes may be closed by means of plugs 16. The pipes 13 may be connected to the drum 1 by means of perforated projections 17 which extend into the holes 12 and are welded to the drum 1 and the pipes 13. The assembly including openings 12 and the perforated projections 17, which allow fluid communication between the drum and pipes 13, may be termed discharge ports. The pipes 13 are closed at one end by the plugs 18 and their other ends communicate with pipes 19 which in turn communicate with a pipe 20. Plugs 21 and 22 may be provided between the pipes 13 and 19 to facilitate cleaning when necessary. The pipe 20 extends revolubly into the header 23 as more clearly shown in Fig. 6, a stuffing box 24 and packing ring 25 being provided for that purpose. An outlet pipe 27 which may be provided with a valve leads from the header 23. An inlet pipe 28 leads to a header 29 from which a pipe 30 leads through a vaportight stuffing box 31 so that it is free to rotate axially therein, the pipe 30 leading to the interior of the drum 1.

The interior of the drum 1, which is preferably made smooth, is lined with blocks of porous material, one of which blocks 35 is illustrated in Figs. 7, 8 and 9 as being provided with ribs or projections 36 which extend beyond the sides of the block 35 as shown at 37 and 38 and also the side of one of these ribs or projections extends beyond the end of the block 35 as shown at 39. The rib 36 along the other end of the block 35 is spaced a short distance from the end of the block as shown at 40. The ribs or projections 36 are spaced apart so as to provide channels 41 between them and these ribs or projections may be interrupted to provide channels 42 at right angles to the channels 41.

Other porous blocks 44 are provided which are similar to blocks 35 except that the projections or ribs 45 do not extend beyond the sides of the block 44 but terminate somewhat short thereof as shown at 46 and 47 (Fig. 11), although the projections extend over one end of the block 46 as shown at 48 in a manner similar to that shown at 39 in Fig. 7 and a space 49 is left along the other end of the block 44 similar to the space 40 in Fig. 9.

The interior of the drum or cylinder 1 is lined with circumferential rows of these porous blocks 35 and 44, a series of blocks 35 constituting alternate rows and the other rows being composed of blocks 44. The blocks 44 are installed with their concave surfaces toward the axis of the drum with their ribs or projections 45 contacting with the inner surface of the drum and each is installed so that the space 49 at one end lies under the projecting edge 48 of a rib on the preceding block and so on until the ambit is made and a circumferential row is completed. The circumferential row of blocks 35 is then installed in a similar manner, the edge 40 of one block extending under the projecting edge 36 of a rib of a preceding block and the ends 31 of the ribs 36 extending over the edges 46, 47 of the block 44, the bolts 50 (Fig. 13) holding the blocks 35 against the inner surface of the drum 1. The heads of the bolts 50 rest in countersunk holes 51 in the blocks 35 and the threaded ends 52 of these bolts screw into the threaded sockets 53 provided on the inside of the drum 1. In this manner the porous filter blocks are interlocked on the interior of the drum 1. The ribs 36 and 45 are aligned so that there will be circumferential channels 42 around the inside of the drum and longitudinal channels 41, these channels communicating with the outlets 12 through the drum 1.

In operating this device for filtering and washing naphthylamine for example, the slurry from the reducer consisting of impure naphthylamine may be introduced through the charging line 28 into the interior of the drum either alone or with a solvent such as solvent naphtha, while the drum is slowly rotated by means of the pinion 7. The liquid material will be drained off through the porous blocks 35 and 44 and will find its way through the holes 12 and the pipes 13 to the header 23 and outlet pipe 27, air or steam being forced into the inside of the rotating filter 1 if desired, in order to aid in driving out the liquor. When it is desired to wash the material further with a solvent to remove the impurities, fresh solvent may be introduced into the inside of the drum upon the layer of the naphthylamine and after dissolving the impurities the same will be carried through the porous blocks and out through the pipes 13, pressure being again applied by air or steam if necessary. Live steam may finally be passed through the filter to drive out the last of the solvent naphtha which might remain in the cake of purified naphthylamine.

I claim:

1. In a filter, a rotatable drum, a filter lining for said drum comprising rows of porous blocks positioned circumferentially of the interior of said drum, alternate rows of said blocks being provided with projections which extend beyond three edges of each of said blocks in said alternate rows and the blocks of the other of said rows having projections which extend beyond one edge, the projections of each block interlocking with the projections on the adjacent blocks.

2. In a filter, a rotatable drum, a filter lining for said drum comprising rows of porous blocks of arcuate cross-section positioned circumferentially of the interior of said drum, said blocks having ribs on one face thereof, the ribs of alternate rows of said blocks forming projections extending from three edges of said blocks of said alternate rows and the ribs of the blocks of the other of said rows forming projections extending from one edge of said blocks in said other rows, the projections of each block interlocking with the projections on the adjacent blocks and means for fastening the blocks of said other rows to the interior of said drum.

3. In a filter, a porous block having ribs on one face thereof, said ribs forming projections extending from three edges of said block.

4. In a filter, a porous block of arcuate cross-section having ribs on one face thereof, said ribs forming projections extending from three edges of said block.

5. In a filter, a rotatable drum, rows of porous blocks lining said drum, alternate rows of said blocks being provided with projections which extend beyond three edges of each of said blocks for interlocking with the next adjacent block.

In testimony whereof I affix my signature.

STUART P. MILLER.